June 12, 1945. H. F. ROESCH 2,378,105
ELECTRIC SERVICE WIRE COUPLING MEANS
Filed Dec. 1, 1942
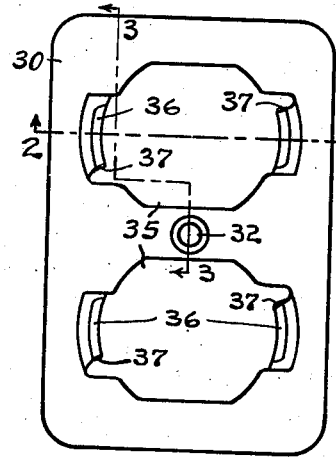
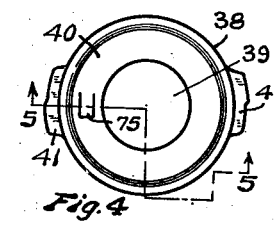
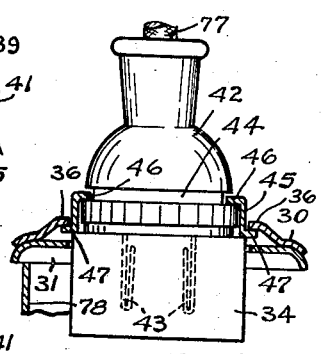
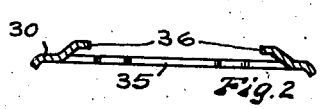
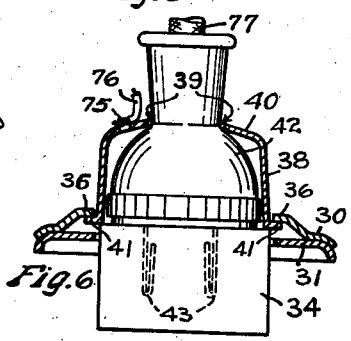
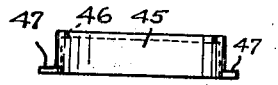
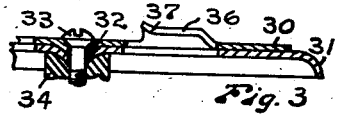
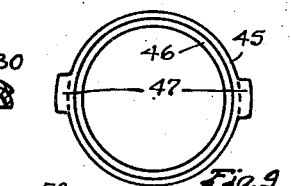
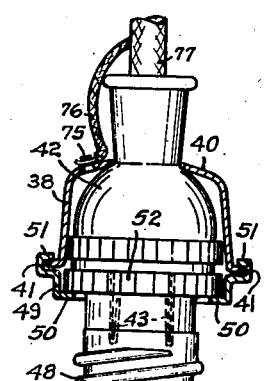
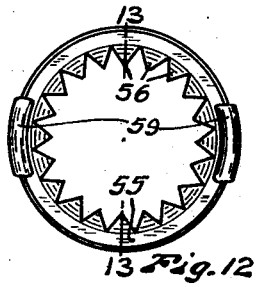
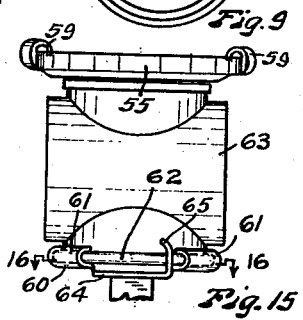
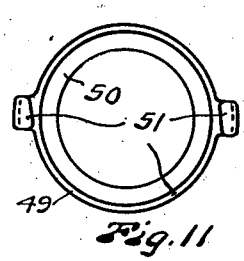
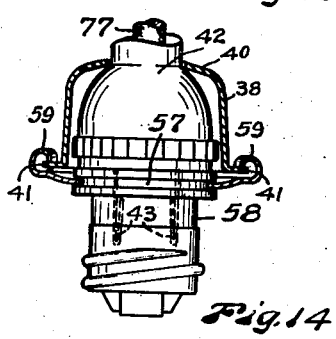
INVENTOR
Herman F. Roesch
BY Fred G. Matheny
ATTORNEY Patented June 12, 1945

2,378,105

UNITED STATES PATENT OFFICE 2,378,105

ELECTRIC SERVICE WIRE COUPLING MEANS

Herman F. Roesch, Seattle, Wash.

Application December 1, 1942, Serial No. 467,535

1 Claim. (Cl. 173—343)

This invention relates to holders for electric service wire couplings of the plug-in type and this application is a continuation in part of my prior copending application Serial No. 320,641, filed February 24, 1940.

An object of this invention is to provide means for locking the plug of an electric service wire coupling in engagement with the socket device into which it is plugged.

In the use of electric service wire couplings of the plug-in type it frequently happens that the two plugged together parts, that is the plug and the socket, of the coupling will be dis-connected when a slight pull is exerted on the electric wires connected therewith. This breaks the circuit to the electric appliance, tool, lamp or the like connected therewith and results in inconvenience, annoyance and loss of time while the connection is being re-established. Also plug-in type electrical connections of the form now in common use are liable to become loose to such an extent that the efficiency of the service is impaired even though it is not entirely cut off.

It is an object of this invention to provide simple and efficient means for securely fastening a plug on the end of an electric service wire to the socket into which it is plugged so that good electrical connection will always be maintained and dis-connection of the two plugged together parts will be prevented.

It is another object of this inventon to provide a holder or lock means for an electric service wire coupling that is applicable to plug-in type couplings of the form now in common use without alteration of any of the parts of said couplings.

Another object of this invention is to provide simple and efficient locking means for electric service wire couplings of the form now commonly used for domestic or household purposes.

Other objects of the invention will be apparent from the folowing description taken in connection with the accompanying drawing, in which:

Fig. 1 is a plan view of an outlet box plate constructed in accordance with this invention.

Fig. 2 is a sectional view taken substantially on broken line 2—2 of Fig. 1.

Fig. 3 is a sectional view taken substantially on broken line 3—3 of Fig. 1, and showing the outlet box plate of Fig. 1, secured to the usual cover plate of an outlet box.

Fig. 4 is a top plan view of an adapter cup embodied in the invention.

Fig. 5 is a view partly in section and partly in elevation of said adapter cup, taken substantially on broken line 5—5 of Fig. 4.

Fig. 6 is an assembly view partly in section and partly in elevation showing the several parts disclosed in Figs. 1 to 5 assembled in connection with an electric wire terminal plug and socket therefor.

Fig. 7 is an assembly view, similar to Fig. 6, showing a modification of this invention.

Fig. 8 is a detached side elevation of an adapter ring shown in Fig. 7.

Fig. 9 is a bottom plan view of said adapter ring.

Fig. 10 is an assembly view partly in section and partly in elevation showing a modification of the invention for connecting together an electric wire terminal plug and a screw plug of the type adapted to be threaded into an electric socket.

Fig. 11 is a detached top plan view of an adapter ring used in the structure shown in Fig. 10.

Fig. 12 is a detached plan view of another type of adapter ring showing the same before it is applied to an electric fitting.

Fig. 13 is a sectional view of said ring taken substantially on broken line 13—13 of Fig. 12.

Fig. 14 is a view partly in section and partly in elevation showing the adapter ring of Figs. 12 and 13 installed on an electric fitting and connected with a cap on a plug member.

Fig. 15 is a detached side elevation of another type adapter ring showing the same attached to a four way fitting on which it may be used.

Fig. 16 is a view partly in plan and partly in section taken substantially on broken line 16—16 of Fig. 15.

Figs. 1 to 6 inclusive show an embodiment of my invention comprising a plate 30 adapted to be placed over and rest upon the usual cover plate 31 of an electric outlet fixture and having a centrally positioned hole 32 for the reception of a screw 33 by which said plate 30 may be secured to the socket portion 34 of the electric outlet box or fixture. The plate 30 has one or more openings 35 shaped to fit over the socket portions 34. The shape of these openings 35 may vary, depending on the type of outlet for which they are intended. Also the shape and size of the plate 30 and position of the hole 32 will be varied to conform to the shape and size of the outlet on which they are to be used, there being numerous different types of outlets in common use, which outlets are generally similar in construction but differ in shape and dimensions.

Two diametrically opposite, upwardly extending catch members 36 are provided in the plate 30 at the margin of the openings 35. These catch members 36 are preferably integral with the plate 30 and are contiguous to the openings 35 and are formed by stamping portions of the plate upwardly. The tip 37 of each catch member 36 is preferably inclined upwardly so that a flange member, hereinafter described, can be readily engaged thereunder and will be firmly gripped and held thereby.

An adapter cup 38, Figs. 4, 5 and 6, is shaped to fit over an electric wire terminal plug 42. The cup 38 is open at one end and has a hole 39 in the other end leaving shoulders 40 that overhang and rest on the plug 42. Two diametrically opposite outwardly extending flanges 41 are provided externally of the cup at the open end thereof. The flanges 41 are adapted to be engaged with and disengaged from the catch members 36 by rotary movement of the cup 38 when said cup is in the position shown in Fig. 6.

Preferably the cup 38 is serrated or scored externally, Fig. 5, to provide a better manual gripping surface thereon.

The plug 42 is of well known shape and has prongs or terminals 43, shown dotted in Figs. 6 and 7, that fit within the usual recesses in socket 34. The adapter cup opening 39 is preferably small enough so that pressure must be used to slip it over the upper end of plug 42, which plug is usually of firm rubber. This prevents easy displacement of adapter cup 38. Preferably cup 38 has a push out clip 75 cut therein for use with cables 77 having ground wires 76, Figs. 4, 5, 6 and 10. Also ground wire 76 may be sweated, soldered or otherwise connected with any grounded part of the outlet box 78. Clip 75 is not used when no ground wire is provided.

In operation plug 42 is plugged into socket 34 in the usual manner. Cup 38 is then rotated on plug 42 far enough to firmly engage flanges 41 under catch members 36 and hold plug 42 against all ordinary pulls. An unusually hard pull on the service wires will bend flanges 41 and disconnect plug 42 from socket 34 before the service wires are broken or pulled loose. Preferably catch members 36 are inclined to firmly hold flanges 41 and limit rotary movement of the cup. Reverse rotation of cup 38 disengages flanges 41 quickly and easily.

The use of auxiliary adapter plate 30 is desirable because it makes possible application of this invention to standard equipment without replacing the usual outlet box cover plate or making any other alterations.

Figs. 7, 8 and 9 show a modified form of the invention in which all of the parts except the adapter cup and the plug are the same as shown in Figs. 1 to 6 and are correspondingly numbered. In said Figs. 7, 8 and 9 the plug 42 is provided with an annular groove 44 and an adapter ring 45 is rotatably mounted on the plug 42 and has an inwardly directed annular flange 46 positioned within the groove 44. External flanges 47 are provided at opposite locations on the ring 45 for engagement with catch members 36 of a plate 30 to secure the plug to the plate 30 in the manner previously described in connection with Figs. 1 to 6.

Figs. 10 and 11 show devices in which a plug 42 and adapter cup 38 of the form shown in Figs. 1 to 6 are used. In said Figs. 10 and 11 means are provided for connecting the plug 42 and adapter cup 38 with a fitting, such as a screw plug 48 of the well known form adapted to be screwed into a threaded socket and to receive the prongs or terminals of the plug 42. This means comprises an adapter ring 49 shaped to fit over the larger outer end portion 52 of the plug 48 and having an inwardly directed flange 50 that engages with said larger end portion 52 and further having two oppositely disposed hook like catch members 51 within which the flanges 41 of the adapter cup 38 engage. When the plug 42 is plugged into the screw plug 48 and the adapter cup 38 and ring 49 are engaged with each other by relatively turning said cup 38 and ring 49 to engage flanges 41 and catch members 51 the two plug members 42 and 48 will be locked together so that they will not be pulled apart by any ordinary strains on the service cords connected therewith.

The apparatus shown in Figs. 10 and 11 is intended primarily for domestic use and, when so used, the third or ground wire 76 will usually be omitted.

Figs. 12, 13, 14 show an adapter ring 55 having internal prongs or teeth 56 shaped triangularly or like the teeth of a saw and adapted to engage within a cylindrical groove 57 that is formed in a socket member such as externally threaded plug 58. This secures the adapter ring 55 to the screw plug 58 in such a manner that it is not easily detached therefrom. Preferably the adapter ring 55 is first formed with the teeth thereof inclined outwardly from the plane of the ring, as shown in Fig. 13. This leaves enough clearance in the ring 55 to allow it to be slipped over the fitting 58, after which the teeth 56 may be bent toward the plane of the ring 55 to cause them to seat within the annular groove 57 and thus secure the adapter ring and fitting 58 together. Preferably the tips of the teeth 56 seat firmly against the bottom of the groove 57 so that the adapter ring 55 and socket member 58 are firmly and non-rotatively secured together. This prevents rotary movement of the adapter ring 55 while an adapter member, such as cup 38, is being rotatively moved into engagement therewith.

The adapter ring 55 is provided with two oppositely disposed inwardly bent hook shaped members 59 within which catch members, such as the flanges 41 of adapter member 38, are adapted to engage when a plug member 42 is plugged into the socket member 58 and the adapter member 38 is rotatively moved. Preferably a lug member 69, Fig. 13, is provided on one or both of the hook members 59 to serve as stop means for the flanges 41 that engage beneath the inwardly bent edges of the hook members 59.

Figs. 15 and 16 show an adapter ring 60 having hook shaped portions 61 crimped over a bead or flange 62 on an end portion of a socket member 63 to rotatively secure the adapter ring to said socket member 63. Two diametrically opposite locking flanges 64 extend outwardly from the ring 60 between the hook shaped portions 61 for engagement with members to which the fitting 63 is to be locked such as the members 51 of Figs. 10 and 11 or the members 59 of Figs. 12, 13 and 14 or the members 36 of Figs. 1, 2 and 3. Preferably a finger lug 65 is provided on each flange 64 substantially perpendicular to the flange for engagement by the fingers in rotatively moving the ring 60.

The fitting 63 shown in Fig. 15 is a multiple outlet fitting, such as a four way fitting, and may have one or more of the adapter rings 55 thereon.

The fitting 63 can be secured by the adapter ring 60 to a screw plug, such as either of the screw plugs 48 or 58, which screw plug is capable of being screwed into an ordinary lamp socket, or the fitting 63 can be secured by the adapter ring 60 to a cover plate 30 of an outlet box.

The fitting 63 may have one or more of the adapter rings 55 provided thereon, one of said adapter rings being shown in Fig. 15.

The devices shown in Figs. 10 to 16 inclusive can be used in many different ways to connect together plug-in types of fittings where the same are to be connected with lamp sockets or wall outlet boxes or where two electric circuit wire cables or cords are to be connected together and for other similar uses.

Obviously changes in this invention may be made within the scope of the following claim.

I claim:

Holding means for use in connection with an electric plug member and an electric socket member, in which the plug member has a body portion with terminal prongs at one end thereof and the socket member has receptacles in one end portion thereof for the reception of the terminal prongs of the plug member and has an external annular groove adjacent its socketed end, comprising an adapter ring on said socket member; inwardly directed teeth of triangular shape on said adapter ring extending into said annular groove and having their pointed tip portions seated against the bottom wall of said groove; inwardly curved hook members on said adapter ring; and an adapter member on said electric plug of smaller diameter than said adapter ring and having outwardly projecting flanges movable into and out of engagement with said hook members by relative rotary movement of said adapter member and said adapter ring when said plug member is plugged into said socket member.

HERMAN F. ROESCH.